United States Patent [19]

Yamada et al.

[11] Patent Number: 6,114,429

[45] Date of Patent: Sep. 5, 2000

[54] THERMALLY CONDUCTIVE SILICONE COMPOSITION

[75] Inventors: Kunihiro Yamada; Takayuki Takahashi; Kenichi Isobe, all of Gunma-ken, Japan

[73] Assignee: Shin-Etsu Chemical Co., Ltd., Tokyo, Japan

[21] Appl. No.: 09/153,334

[22] Filed: Sep. 15, 1998

Related U.S. Application Data

[63] Continuation-in-part of application No. 09/129,952, Aug. 6, 1998, abandoned.

[30] Foreign Application Priority Data

Aug. 6, 1997 [JP] Japan ..................................... 9-225715

[51] Int. Cl.$^7$ ....................................................... H01B 1/04
[52] U.S. Cl. ........................... 524/432; 252/512; 252/516; 524/404; 524/428
[58] Field of Search ..................................... 524/432, 428, 524/404; 252/512, 516

[56] References Cited

U.S. PATENT DOCUMENTS

| | | | |
|---|---|---|---|
| 4,292,225 | 9/1981 | Theodore | 260/29.1 |
| 5,221,339 | 6/1993 | Takahashi | 106/287.13 |

*Primary Examiner*—Paul R. Michl
*Attorney, Agent, or Firm*—Millen, White, Zelano & Branigan, P.C.

[57] ABSTRACT

A thermally conductive silicone composition which comprises (A) 5 to 30 weight % of a liquid silicone, (B) 50 to 94.98 weight % of at least one thickener selected from the group consisting of a zinc oxide powder, an aluminum powder, an aluminum nitride powder, a boron nitride powder and a silicon carbide powder, (C) 0.01 to 10 weight % of an organopolysiloxane having at least one per molecule of hydroxyl group attached directly to a silicon atom, and (D) 0.01 to 10 weight % of an alkoxysilane, thereby retainining satisfactory thermal conductive properties and hardly causing oil bleeding over a long time.

20 Claims, 1 Drawing Sheet

THERMALLY CONDUCTIVE SILICONE COMPOSITION

This application is a continuation-in-part of Ser. No. 09/129,952 filed Aug. 6, 1998, abandoned.

FIELD OF THE INVENTION

The present invention relates to a thermally conductive composition and, more particularly, to a silicone composition suitable for reducing the heat from electronic parts over a long time.

BACKGROUND OF THE INVENTION

Most of electric and electronic appliances generate heat while they are used, so that the removal of the generated heat therefrom is necessary for their normal operation. With the intention of removing the generated heat from those appliances, many means have been proposed. For instance, in miniature electronic parts, especially electronic devices provided with integrated circuits, thermally conductive materials, such as a thermally conductive grease and a thermally conductive sheet [Japanese Tokko Sho 57-36302 (U.S. Pat. No. 4,265,775), wherein the term "Tokko" means an "examined patent publication", and Japanese Tokkai Sho 61-157587, wherein the term "Tokkai" means an "unexamined published patent application"], have been used as such means.

In general, an electronic device comprises integrated circuits and cap parts for protecting them, and a thermally conductive material is applied so as to contact directly with both the circuit element and the heat reducing part, or indirectly therewith via certain materials. Thus, the heat generated from integrated circuit chips during operation is transmitted in the thermally conductive material to be transferred directly or indirectly to the heat reducing part, and further radiated therefrom. The rough sectional view of such an electronic device, wherein a thermally conductive material is used, is shown in FIG. 1.

As the aforementioned thermally conductive material, there has already been known a heat-reducing grease of the type which uses a silicone oil as a base material and a zinc oxide or alumina powder as a thickener (Japanese Tokko Sho 52-33272 and Japanese Tokko Sho 59-52195). In recent years, aluminum nitride has been developed as a thickener which enables further improvement of thermal conductivity (as disclosed, e.g., in Japanese Tokkai Sho 52-125506).

The foregoing silicone compositions in a state of grease are prepared by mixing a silicone oil with a thickener having a low affinity for the silicone oil, so that they have a problem of separating the oil from the composition (in terms of the degree of oil separation) upon long-term standing at a high temperature or by a long-range repetition of cooling and heating cycles, and so on. This problem frequently arises in cases where the thickener used has a relatively large particle size and excellent thermal conductivity.

Therefore, various studies have so far been given to the problem of discovering a thermally conductive grease-state silicone composition having reduced oil separation. As a result, the thermally conductive materials as described below have been disclosed; for instance, one material disclosed is the silicone grease composition which comprises 10–50 parts by weight of an organopolysiloxane modified by 2-phenylethyl, 2-phenylpropyl or 6–30C alkyl groups and 90–50 parts by weight of a metal oxide, such as silica, diatomaceous earth, zinc oxide, alumina or titanium oxide (Japanese Tokkai Sho 51-55870), and another material disclosed is the thixotropic thermally conductive material which comprises an oily organosilicone carrier, a thermal conductivity-providing filler powder selected from a group consisting of thin-leaf aluminum nitride, dendrite-form zinc oxide, thin-leaf boron nitride and a mixture of two or more thereof and a silica fiber acting as an exudation inhibitor [see Japanese Tokko Sho 57-36302 (U.S. Pat. No. 4,265,775)].

Other materials disclosed are the thermally conductive silicone grease composition comprising an organopolysiloxane, silicon carbide and aerosol silica (see Japanese Tokkai Sho 62-43492), and the thermally conductive silicone oil compound comprising a hydroxyl group-containing organopolysiloxane having a viscosity of 10 to 100,000 cs wherein the hydroxyl groups comprise 5–50 mole % of the total end groups and a powder of at least one metal compound selected from a group consisting of zinc white, alumina, aluminum nitride and silicon nitride [see Japanese Tokkai Hei 2-212556 (U.S. Pat. No. 5,221,339)].

Still another material disclosed is the heat-reducing silicone grease composition which comprises an organopolysiloxane having a viscosity of 5 to 500,000 cs, a MQ resin constituted of $R_3SiO_{1/2}$ units, $R_2SiO$ units and $SiO_2$ units and having the $R_3SiO_{1/2}/SiO_2$ ratio in the range of 0.5:1 to 2:1 by mole and a thickener selected from the group consisting of zinc oxide, alumina, aluminum nitride, boron nitride and silicon carbide [Japanese Tokkai Hei 3-162493 (U.S. Pat. No. 5,100,568)].

However, the grease-state silicone compositions disclosed in Japanese Tokko Sho 57-36302 (U.S. Pat. No. 4,265,775) and Japanese Tokkai Sho 62-43492 have a drawback of being insufficient in thermal conductivity because they contain as an additive a silica fiber and aerosol silica respectively, and thereby the content of the thickener having high thermal conductivity is reduced. And the grease-state silicone compositions disclosed in Japanese Tokkai Sho 51-55870 and Japanese Tokkai Hei 2-212556 (U.S. Pat. No. 5,221,339), though they use particular organopolysiloxanes, are still unsuccessful in satisfactory reduction of oil separation. On the other hand, the heat-reducing silicone grease composition disclosed in Japanese Tokkai Hei 3-162493 is successful in prevention of oil exudation, but has a problem that the thermal conductivity cannot be raised up to a satisfactory extent because the composition is rather hard due to the tackiness of MQ resin contained therein to make it difficult to increase the thickener content due to viscosity limit placed on the composition as grease.

SUMMARY OF THE INVENTION

As a result of our intensive studies to solve the aforementioned problems, it has been found that the bleeding liability of a base oil can be controlled by combining a particular organopolysiloxane with a thickener, such as zinc oxide, alumina, aluminum nitride, boron nitride or silicon carbide, an organopolysiloxane having at least one hydroxyl group attached directly to a silicon atom and an alkylalkoxysilane, thereby achieving the present invention.

Therefore, an object of the present invention is to provide a thermally conductive silicone composition having high reliability which can steadily display thermally conductive properties over a long period of time, brings no oil stain on the surroundings, and does not cause contact point disturbance and the like.

The above-described objects of the present invention are attained with a thermally conductive silicone composition comprising (A) 5 to 30 weight % of a liquid silicone, (B) 50 to 94.98 weight % of at least one thickener selected from the group consisting of a zinc oxide powder, an alumina powder, an aluminum nitride powder, a boron nitride powder and a silicon carbide powder, (C) 0.01 to 10 weight % of an organopoly-siloxane having at least one per molecule of hydroxyl group attached directly to a silicon atom, and (D) 0.01 to 10 weight % of an alkoxysilane.

The thermally conductive silicone composition according to the present invention can control effectively the bleeding of the base oil and the thermal conductive properties thereof can persist stably for a long time, so that it is suitable for thermal conductive silicone grease.

Figure 1:
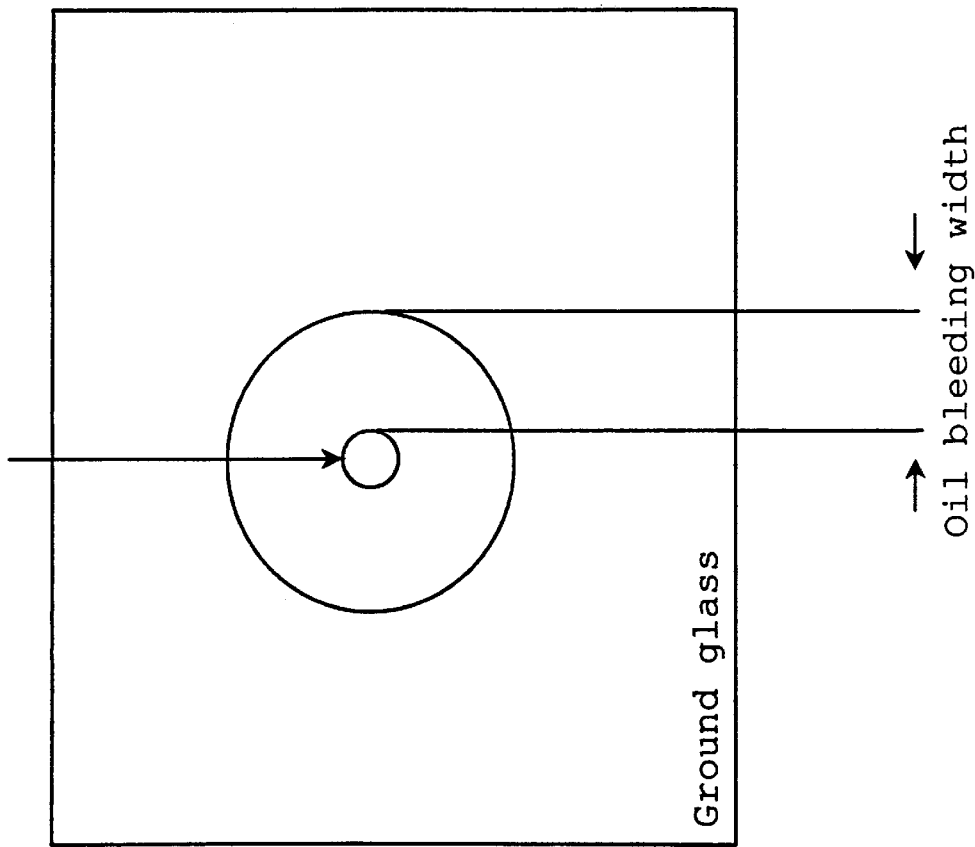
FIG. 1 is a sketch showing a way to evaluate the degree of oil bleeding.

DETAILED DESCRIPTION OF THE INVENTION (A) Liquid Silicone:

The liquid silicone used in the present invention can be properly selected from known silicones which are liquid at room temperature, such as organopolysiloxanes, organopoly-silalkylenes, organopolysilanes and copolymers thereof. From the viewpoint of ensuring heat resistance, stability and electric insulation, however, it is desirable to use organopolysiloxanes, particularly an organopolysiloxane represented by compositional formula $R_a SiO_{(4-a)/2}$, as the present liquid silicone.

In the above formula, $R_a SiO_{(4-a)/2}$, each R is a group selected from monovalent organic groups, excepting a hydroxyl group, and all R groups may be the same or different.

Examples of a monovalent organic group as R include monovalent unsubstituted or substituted hydrocarbon groups having 1 to 30 carbon atoms, such as alkyl groups (e.g., methyl, ethyl, propyl, butyl, pentyl, hexyl, octyl, decyl, dodecyl, tetradecyl, hexadecyl, octadecyl, etc.), cycloalkyl groups (e.g., cyclohexyl, etc.), alkenyl groups (e.g., vinyl, allyl, etc.), aryl groups (e.g., phenyl, naphthyl, tolyl, etc.), and groups formed by substituting halogen atom(s), cyano group(s), hydroxyl group(s) or/and so on for part or all of the hydrogen atoms attached to carbon atoms present in the above-recited groups (e.g., chloromethyl, 3,3,3-trifluoropropyl, cyanopropyl, phenol, hindered phenol, etc.); and organic functional groups, such as an organic group having an amino group, an organic group having a polyether group and an organic group having an epoxy group. Of these organic groups, a methyl group, a phenyl and an alkyl groups having 6 to 14 carbon atoms are preferred over the others.

The organopolysiloxane used in the present invention can have any of linear, branched and cyclic structures, and it is not necessarily a single compound, but it can be a mixture of two or more of organopolysiloxanes different in structure. In the foregoing formula, a is a number of 1.8–2.3, but it is preferably within the range of 1.9 to 2.1. This is because the organopolysiloxane can have a linear structure or a structure close thereto when a is in such a range.

For acquiring satisfactory grease characteristics, it is desirable that the viscosity of the foregoing organopolysiloxane be from 50 to 500,000 cs, particularly from 50 to 300,000 cs, at 25° C. When the viscosity is below 50 cs at 25° C., the grease obtained shows a strong tendency to oil separation; while, when it is above 500,000 cs at ° C., the grease prepared is so high in consistency that it cannot possibly be dispensed to a substrate in a satisfactory condition.

Specific examples of such an organopolysiloxane include those represented by the following formula (I):

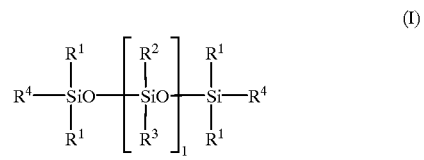

(I)

wherein each of $R^1$ groups is a group selected from monovalent unsubstituted or substituted hydrocarbon groups having 1 to 30 carbon atoms, such as alkyl groups (e.g., methyl, ethyl, propyl, butyl, pentyl, hexyl, octyl, decyl, dodecyl, tetradecyl, hexadecyl, octadecyl, etc.), cycloalkyl groups (e.g., cyclohexyl, etc.), alkenyl groups (e.g., vinyl, allyl, etc.), aryl groups (e.g., phenyl, naphthyl, tolyl, etc.) and groups formed by substituting halogen atom(s), cyano group (s), hydroxyl group(s) or/and so on for part or all of the hydrogen atoms attached to carbon atoms present in the above-recited groups (e.g., chloromethyl, 3,3,3-trifluoropropyl, cyanopropyl, phenol, hindered phenol, etc.); $R^2$ and $R^3$ groups are the same or different, and each of them is the same monovalent hydrocarbon group as $R^1$ represents, an amino group-containing organic group, a polyether group-containing organic group or an epoxy group-containing organic group; $R^4$ is a hydrogen atom, the same monovalent hydrocarbon group as $R^1$ represents or the same monovalent organic group as $R^2$ or $R^3$ represents; and l is a positive number to ensure the viscosity of from 50 to 500,000 cs at 25° C. in the organopolysiloxane. From the standpoint of improving, e.g., the thermal resistance, the substituted hydrocarbon group represented by $R^1$, $R^2$, $R^3$ and $R^4$ each may be a monovalent substituted hydrocarbon group having the hindered phenol structure described in Japanese Tokko Hei 3-131692.

It is desirable for the organopolysiloxane used in the present invention to be blocked with trimethylsilyl groups at the molecular chain ends thereof. As for $R^2$ and $R^3$ each, an alkyl group, such as methyl or ethyl, and an aryl group, such as phenyl or tolyl, particularly a methyl group, a phenyl group and alkyl groups having 6 to 14 carbon atoms, are favorable with respect to easiness of synthesis and thermal resistance and electric insulation of the oil obtained.

The organopolysiloxane oil as mentioned above can be produced in accordance with known methods. For instance, a dimethylpolysiloxane oil can be produced by subjecting a low molecular cyclic siloxane, such as octamethylcyclotetrasiloxane or decamethylcyclopentasiloxane, to a ring-opening reaction in the presence of an acid catalyst, such as sulfuric acid, chlorosulfonic acid, nitric acid, phosphoric acid, activated clay, acid clay or trifluoroacetic acid, or an alkaline catalyst, such as potassium hydroxide, sodium hydroxide, rubidium hydroxide, cesium hydroxide, potassium oxide, potassium acetate or calcium silanolate, and then polymerizing the reaction product.

At the stage of polymerization in the foregoing method, the polymerization degree is required to be controlled for obtaining a dimethylpolysiloxane oil having the intended viscosity, and the control thereof can be achieved by properly adding a low molecular weight siloxane having a terminal blocking group, such as hexamethyldisiloxane, octamethyltrisiloxane or decamethyltetrasiloxane, in the course of polymerization.

As for the production of organopolysiloxanes having carbon functional groups, on the other hand, an amino group-containing organopolysiloxane can be produced by the dealcoholating condensation reaction between an organopolysiloxane having at least one silanol group and an amino group-containing alkoxysilane, and an epoxy group- or polyether group-containing organopolysiloxane can be produced by the addition reaction of a compound having both epoxy or polyether group and an unsaturated group, such as vinyl group, with an organohydrogenpolysiloxane, which has a hydrogen-attached silicon atom, in the presence of a platinum catalyst.

However, the organopolysiloxane oils produced in accordance with the foregoing methods generally contain low molecular weight siloxanes having at most 12 siloxane units in a proportion of about 10%, because they are obtained as equilibrated mixtures of polysiloxanes produced with the progress of polymerization which are various in their polymerization degrees.

After the syntheses using the foregoing methods, therefore, the products obtained generally undergo a stripping treatment at a temperature of 120–250° C. under a reduced pressure to remove the low molecular weight siloxanes therefrom. Even after the stripping treatment, however, the low molecular weight siloxanes still remain in a quantity of 500–2,000 ppm. These low molecular weight siloxanes have a strong adsorbing power, compared with nonpolar combustible gases, so that their vapors are adsorbed strongly by various electrical contact parts and so on.

The low molecular weight siloxanes adsorbed to electrical contact parts are converted into $SiO_2 \cdot nH_2O$ by undergoing oxidation, and further accumulated in the form of $SiO_2$ on the surface of the contact parts to cause a contact point disturbance. Therefore, the presence of low molecular weight siloxanes is already known to be undesirable.

In addition, it is also known that such a trouble can be prevented by reducing each of the contents of low molecular weight siloxanes having no more than 12 siloxane units to at most 50 ppm.

The removal of the foregoing low molecular weight siloxanes can be effected by subjecting an organopolysiloxane oil produced by the foregoing conventional method to a stripping treatment at a high temperature of 150–300° C. under a reduced pressure of 50 mmHg or below in an atmosphere of dried nitrogen gas, or by extracting the low molecular weight siloxanes contained in the foregoing organopolysiloxane oil with an alcohol or ketone solvent. More specifically, each of the contents of low molecular weight siloxanes in the organopolysiloxane oil produced by the foregoing conventional method can be reduced to less than 50 ppm by carrying out the treatment as mentioned above, and the total content of the low molecular weight siloxanes having from 2 to 12 siloxane units can be reduced to less than 500 ppm.

Examples of a liquid silicone preferably used in the present invention include those represented by the following formula (II), but these examples should not be construed as limiting on the scope of the present invention anyway:

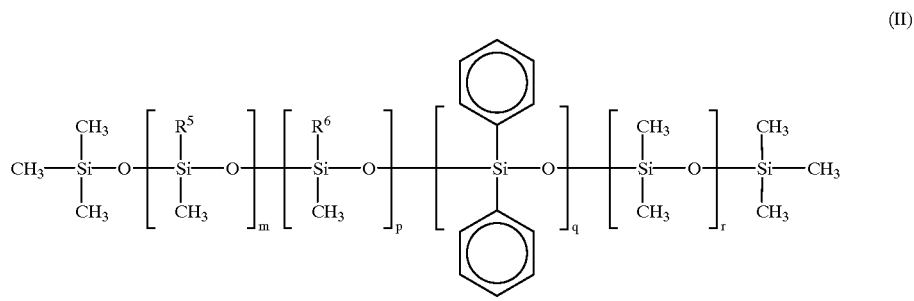

(II)

wherein $R^5$ is $—C_4H_9$, $—C_6H_{13}$, $—C_8H_{17}$, $—C_{10}H_{21}$, $—C_{12}H_{25}$, $—C_{15}H_{31}$ or $—C_{18}H_{37}$; $R^6$ is a 2-phenylethyl group or a 2-phenylpropyl group; and m, p, q and r are each a number satisfying the following equations: $0 \leq m \leq 1,000$, $0 \leq p \leq 1,000$, $0 \leq q \leq 1,000$, $0 \leq r \leq 2,000$ and $5 \leq m+p+q+r \leq 2,000$.

From the viewpoint of ensuring consistency and dispensation property suitable for silicone grease in the present composition, it is desirable that the liquid silicone used in the present invention have a viscosity in the range of 50 to 500,000 cs, particularly 100 to 100,000 cs, at 25° C.

The representatives of liquid silicones used as Component (A) are illustrated below:

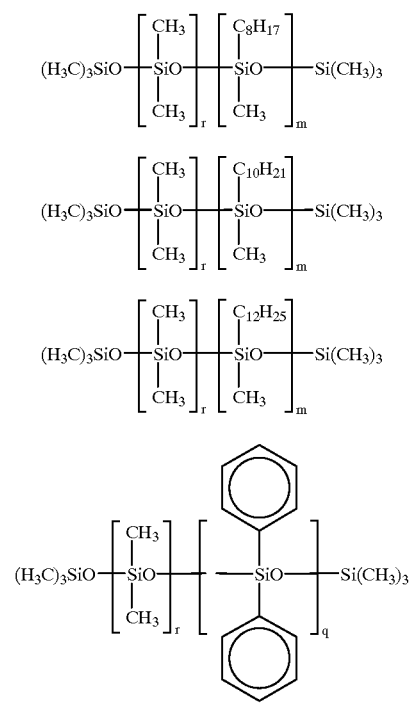

-continued

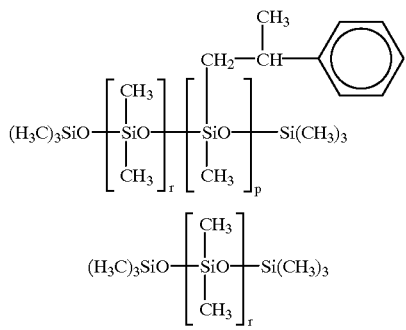

(B) Thickener:

In order to confer heat conducting properties on the present composition, the thickener used as Component (B) is required to be a filler having a high thermal conductivity. Such a thickener can be a powder of at least one inorganic compound selected from a group consisting of zinc oxide, alumina, aluminum nitride, boron nitride and silicon carbide. The surface of such an inorganic compound powder as recited above may be rendered hydrophobic by treatment with an organosilane, an organosilazane, an organopolysiloxane, an organic fluorine-containing compound or the like, if desired. When the proportion of such a thickener in the present composition is less than 50 weight %, the resulting composition cannot have sufficient thermal conductivity; while, when it is increased beyond 94.98 weight %, the resulting composition becomes poor in extensibility. Accordingly, it is required for the thickener to be used in a proportion ranging from 50 to 94.98 weight %. In particular, the use of a thickener in a proportion of from 70 to 90 weight % is advantageous to the present composition.

(1) Zinc Oxide Powder;

The zinc oxide used in the present invention is a white powder of zinc oxide having a hexagonal or wurtzite crystal structure, which is generally called Zinc White. Such a zinc oxide powder can be prepared using known methods. For instance, one known method is an indirect method in which the zinc vapor generally produced by heating metallic zinc to 1,000° C. is oxidized with hot air, and another known method is a direct method wherein the zinc oxide obtained by roasting zinc ore is reduced by coal or the like and the zinc vapor produced is oxidized with hot air, or wherein the slag obtained by the leaching of zinc ore with sulfuric acid is admixed with coke, heated in an electric furnace and the zinc vapor produced thereby is oxidized with hot air.

The zinc oxide produced using any of the foregoing methods is cooled by passing through an air condenser equipped with a blower, and fractionated according to the grain size. As still another production method of zinc oxide, there is known a wet method in which a zinc salt solution is admixed with an alkali carbonate solution to precipitate zinc hydroxycarbonate and the zinc hydroxycarbonate obtained is roasted.

The thus obtained zinc oxide powders are defined in accordance with the Japanese Industrial Standards, JIS K1410 and K5102, or American standards, ASTM-D79.

In the present invention, the zinc oxide powders produced by any of the aforementioned methods can be used alone, or a mixture of zinc oxide powders produced by different methods may be used.

In general the zinc oxide powder is used not only as a vulcanization accelerator for rubber but also in the fields of coating color, ceramics, enameled ware, glass, ferrite, cosmetics and medicines. Further, it is known to use a zinc oxide powder as a thermal conductivity providing filler in a thermally conductive grease [Japanese Tokkai Sho 51-55870, Sho 54-116055, Sho 55-45770, Sho 61-157587, Hei 2-212556 (U.S. Pat. No. 5,221,339), Hei 3-162493 (U.S. Pat. No. 5,100,568) and Hei 4-202496; and Japanese Tokko Sho 57-36302 (U.S. Pat. No. 4,265,775)].

The average particle size of a zinc oxide powder which can be used in the present invention is in a wide range of 0.2 to 5 $\mu$m. In view of the dispersibility in a liquid silicone and the relation with other powders used in combination, however, it is desirable for the zinc oxide powder used to have an average particle size in the range of 0.3 to 4 $\mu$m, particularly 0.3 to 3 $\mu$m. Further, it is desirable for the zinc oxide used to have Mohs' hardness of from 4 to 5.

The thermal conductivity of zinc oxide is $6.0 \times 10^{-2}$ cal/cm·sec·° C. in theory, but zinc oxide powders produced in usual manners have thermal conductivities lower than the theoretical value because they contain impurities, voids or/and bubbles. In the present invention, it is desirable to use a zinc oxide powder having a thermal conductivity of at least $1.2 \times 10^{-2}$ cal/cm·sec·° C. at room temperature.

(2) Alumina Powder:

The alumina powder usable as a thermal conductivity providing filler in the present invention is a powder of aluminum oxide represented by chemical formula, $Al_2O_3$, and includes aluminum oxide powders generally referred to as Alumina, $\alpha$-Alumina, Single crystal corundum fines and Spherical Alumina respectively depending on their preparation methods.

In general the so-called Bayer method, wherein bauxite as a raw material is treated with hot sodium hydroxide, is employed as an industrial manufacturing method of alumina. In this method, crystals of aluminum hydroxide (Al(OH)$_3$) are once formed, and then burned at a high temperature, e.g., in a rotary kiln to be converted into alumina. Alumina has excellent thermal, mechanical and physical-and-chemical characteristics, so that it is widely used for various refractories, abrasives, porcelain, white filling pigments, catalysts and so on.

In general the alumina powder is an $\alpha$-alumina powder having a crystal structure belonging to a hexagonal system, and it is a white powder in appearance. Such an $\alpha$-alumina powder has an apparent average particle size of the order of 20–80 $\mu$m, and each particle is made up of primary crystalline alumina having a size of about 0.5 $\mu$m to about 20 $\mu$m. Also, the $\alpha$-alumina powder can be produced in various grades depending on the intended use thereof. In the case where an $\alpha$-alumina powder is used for a silicone grease, the shape and the size thereof have delicate effects on characteristics of the resulting grease, including homogeneity and consistency.

The alumina powder used in the present invention can have its apparent average particle size in a wide range of 20 to 80 $\mu$m, but from the viewpoint of dispersibility in a liquid silicone it is desirable that the apparent average particle size thereof be in the range of 30 to 50 $\mu$m, particularly 30 to 40 $\mu$m. As for the hardness of an alumina powder, the general alumina is very hard and the Mohs' hardness thereof is from 8 to 9. In the present invention, it is possible to use alumina powders having Mohs' hardness in such a range.

The thermal conductivity of alumina is $6.5 \times 10^{-2}$ cal/cm·sec·° C. in theory, but the measured thermal conductivity of an alumina powdery product is generally lower than the theoretical value because they are more or less contaminated with impurities and contain voids or/and bubbles.

In the present invention, it is desirable to use an alumina powder having a thermal conductivity of at least $1.2 \times 10^{-2}$ cal/cm·sec·° C. at room temperature. Even if the alumina powder having a thermal conductivity lower than $1.2\times10^{-2}$ cal/cm·sec·° C. is incorporated in a grease or sheet, sufficient thermal conductivity cannot be conferred on the grease or the sheet.

(3) Aluminum Nitride Powder:

The aluminum nitride powder used as a thermal conductivity providing filler in the present invention is a nitride of Group III–V metal which generally has a crystal structure of hexagonal system or wurtzite type, and colored white or grayish white in appearance. The particle shape thereof is polygonal or spherical depending on the preparation method used.

Such an aluminum nitride powder is prepared using, e.g., a direct nitriding method in which a metallic aluminum powder is allowed to react directly with nitrogen or ammonia, an alumina reduction method in which a mixture of alumina and carbon powders is heated in an atmosphere of nitrogen or ammonia to undergo reduction and nitriding reactions at the same time, a method of reacting aluminum vapor directly with nitrogen, or the pyrolysis of $AlCl_3 \cdot NH_3$.

In the present invention can be used a highly pure aluminum nitride ceramic prepared by using as a raw material an aluminum nitride powder prepared by the method as mentioned above and sintering the raw material. In preparing such a highly pure aluminum nitride ceramic, the aluminum nitride powder used as a raw material is required to be susceptible to sintering by having high purity and being a fine powder having a uniform primary particle size of the order of 0.5 μm.

The aluminum nitride powder used in the present invention may be prepared in any method, although the characteristics thereof, including the chemical composition (impurities), the particle shape and the particle size distribution are various depending on the preparation method adopted. Also, the powders prepared in different methods may be used as a mixture.

The thus obtained aluminum nitride powder is a very hard material, and has an excellent thermal conductivity, electric insulation and mechanical strength.

The aluminum nitride powders having their average particle sizes in a wide range of 0.5 to 5 μm can be used in the present invention. In view of the dispersibility in a liquid silicone, however, it is desirable for the powder used in the present invention to have an average particle size in the range of 1 to 4 μm, particularly 2 to 4 μm.

When the average particle size of an aluminum nitride powder is smaller than 0.5 μm, the powder is undesirable for use because of its too great viscosity-increasing effect. In other words, the grease obtained using such a powder has low consistency (or hard and poor in dispensation suitability). When the average particle size is larger than 5 μm, on the other hand, the thermally conductive material obtained is poor in uniformity and stability and, what is worse, the base oil separates therefrom to a considerable extent (namely, the material obtained is high in oil-separation degree). Therefore, it is a matter of course that good grease cannot be obtained in the foregoing cases.

Further, it is desirable for such a powder to have a specific surface area of from 1 to 5 $m^2$/g. In particular, the specific surface area ranging from 2 to 4 $m^2$/g is preferred from the viewpoint of compatibility with a liquid silicone.

In general, aluminum nitride is very hard, and the Mohs' hardness thereof is within the range of 7 to 9. Any aluminum nitride can be used in the present invention as far as the Mohs' hardness thereof is in the foregoing range. In particular, the aluminum nitride having Mohs' hardness of from 8 to 9 is used to advantage.

The thermal conductivity of aluminum nitride is $7.7\times10^{-1}$ cal/cm·sec·° C. in theory, but the actually measured value is lower than the theoretical value, specifically $6.0\times10^{-1}$ cal/cm·sec·° C. or below, because the aluminum nitride powder obtained in practice is more or less contaminated with impurities and contains voids and bubbles. It is desirable for the aluminum nitride powder used in the present invention to have a thermal conductivity of at least $1.5\times10^{-1}$ cal/cm·sec·° C., particularly at least $2.4\times10^{-1}$ cal/cm·sec·° C., at room temperature. When the thermal conductivity of an aluminum nitride powder used is below $1.5\times10^{-1}$ cal/cm·sec·° C., the thermal conductivity of the grease or the sheet obtained cannot reach such a high value as to be aimed at by the present invention.

Examples of aluminum nitride which can be used in the present invention include US, UF and UM, trade names, produced by Toyo Aluminum Co., Ltd., XUS-55548, trade name, produced by Dow Chemical Co., Ltd., H-grade and F-grade, trade names, produced by K.K. Tokuyama, FA and ES-10, trade names, produced by Nippon Light Metal Co., Ltd., and A-100WR, A-100 and AG-SD, trade names, produced by Advanced Refractory Technologies Inc.

(4) Boron Nitride Powder:

In a method of preparing a boron nitride powder which can be adopted in the present invention, boric acid or a borate is heated in combination with an nitrogen compound, such as a nitrogen-containing organic compound or ammonia to yield a boron nitride powder having a hexagonal crystal structure similar to that of graphite, or a hexagonal network laminate. The boron nitride of hexagonal system has characteristics such that it retains high lubricity even in a high temperature range, has high thermal conductivity as well as high electrical insulating capacity, and further is chemically stable and hardly wetted with fused metal or glass. Accordingly, it is used as an electrical insulating filler having high thermal conductivity, a solid lubricant, a filler for modification of resins, or the like.

The boron nitride powder having a crystal structure of hexagonal system is white in appearance, and has an average particle size of 1 to 10 μm.

The boron nitride powder which can be used in the present invention has its average particle size in a wide range of 1 to 10 μm. In viewing the dispersibility in a liquid silicone and the prevention of oil separation, however, it is desirable for the powder used in the present invention to have an average particle size in the range of 1 to 5 μm.

In general, the boron nitride powder having a crystal structure of hexagonal system is soft. In the present invention, boron nitride powders having Mohs' hardness in the range of 1 to 3 are usable. In particular, the boron nitride powder having Mohs' hardness of the order of 2 is used favorably.

The thermal conductivity of boron nitride is $1.44\times10^{-1}$ cal/cm·sec·° C. in theory, but the actually measured value is lower than the theoretical value because the boron nitride powder obtained in practice is more or less contaminated with impurities and contains voids and bubbles. It is desirable for the boron nitride powder used in the present invention to have a thermal conductivity of at least $1.2\times10^{-2}$ cal/cm·sec·° C. at room temperature. Even if the boron nitride powder having a thermal conductivity lower than $1.2\times10^{-2}$ cal/cm·sec·° C. is incorporated in a grease or sheet, sufficient thermal conductivity cannot be conferred on the grease or the sheet.

On the other hand, the aforementioned hexagonal boron nitride can be used as a raw material, and subjected to processing under a high temperature and ultra-high pressure condition. By this processing, the hexagonal boron nitride is converted into cubic boron nitride on the basis of the same principle as the diamond structure. The thus prepared boron nitride powder having a crystal structure of cubic system has hardness second to diamond, and colored brown to black in appearance. The cubic boron nitride powders available in the market are powders having their particle sizes in the range of several to 800 μm.

Although it is possible to use such a cubic boron nitride powder in the present invention, the present invention does not prefer such a powder because the thermal conductivity thereof is from 1.3 to $8.6 \times 10^{-3}$ cal/cm·sec·° C., so it is too low to ensure satisfactory thermal conductivity in the resulting grease or the sheet, which is an object of the present invention.

(5) Silicon Carbide Powder:

A silicon carbide powder is generally obtained by producing high-purity α-SiC ingot from silica and coke as the main raw materials by means of an electric resistance furnace (Acheson furnace) and subjecting the thus produced ingot to pulverizing, decarburizing, iron-removing and sieving steps in succession. This process can provide silicon carbide powders having various particle size distributions depending on the intended uses. Further, an ultra fine silicon carbide powder can be prepared by choosing a powder having a moderate particle size distribution as starting material, thoroughly grinding the powder into fine particles of sub-micron order in size, sieving them, and further purifying by a chemical treatment.

The particle diameter and the particle size distribution of silicon carbide are determined by the methods defined in JIS R6001, JIS R6002 and JIS R6124. The average particle size of a silicon carbide powder used in the present invention, though it may be in the wide range of 0.4 to 10 μm, is desirably in the range of 0.4 to 5 μm from the viewpoints of securing high dispersibility in liquid silicone and preventing oil separation. The silicon carbide powders are bluish black in appearance, have a crystal structure of trigonal prism, and are generally hard. With respect to the hardness, silicon carbide powders are usable in the present invention so far as they have Mohs' hardness in the range of 8 to 9.

The thermal conductivity of silicon carbide is $2.4 \times 10^{-1}$ cal/cm·sec·° C. in theory, but the actually measured value is lower than the theoretical value because the silicon carbide powder obtained in practice is more or less contaminated with impurities and contains voids and bubbles. It is desirable for the silicon carbide powder used in the present invention to have a thermal conductivity of at least $1.2 \times 10^{-2}$ cal/cm·sec·° C. at room temperature. Even if the silicon carbide powder having a thermal conductivity lower than $1.2 \times 10^{-2}$ cal/cm·sec·° C. is incorporated in a grease or sheet, sufficient thermal conductivity cannot be conferred on the grease or the sheet.

The thermal conductivity of a thermally conductive silicone composition according to the present invention depends on the ratio of a thermal conductivity providing filler, which functions as a thickener also, to a liquid silicone (or the filling rate).

In order to achieve a high thermal conductivity aimed at by the present invention, it is required to increase the filling rate of an aluminum nitride powder which has much higher thermal conductivity than other thickeners. In raising the filling rate of an aluminum nitride powder without damaging grease characteristics, the shape and the size of thickener particles have a very important role. Apart from a thermally conductive sheet, an increase in filling rate tends to cause a decrease in consistency of the grease obtained, thereby spoiling the dispensation suitability of the grease.

The term "dispensation suitability" as used herein indicates the ease of the work in coating a grease on a substrate. When the grease has an inferior dispensation suitability, the ease of the coating work using a cylinder-form apparatus equipped with a grease extruding means is reduced and it becomes difficult to form a thin coating of the grease on a substrate. In the case of a thermally conductive material as grease, therefore, the shape as well as the diameter of thickener particles constitutes a very important factor in achieving a high filling rate while securing a dispensation suitability.

However, an aluminum nitride powder consists of square- or flake-shaped particles rather than sphere-shaped particles due to the production process and crystal structure thereof, so that it tends to increase the viscosity of a thermally conductive material with a rise in filling rate thereof in the material. In other words, the rise in filling rate causes an increase in the viscosity, or a drop in consistency, of the thermally conductive material to impair the dispensation suitability required for a thermally conductive grease.

On the other hand, the thermal conductivity of zinc oxide is $6.0 \times 10^{-2}$ cal/cm·sec·° C. in theory, namely it is lower than that of aluminum nitride, namely $7.7 \times 10^{-1}$ cal/cm·sec·° C., so that it has rarely been used in the fields where high thermal conductivity is needed. As for the hardness, however, zinc oxide is softer than aluminum nitride. Accordingly, if the zinc oxide powder is used in combination with aluminum nitride powder, every individual soft zinc oxide particle can be arranged among hard aluminum nitride particles to function so as to confer a mobility on the close-packed structure to enable an improvement in dispensation suitability.

By mixing the aluminum nitride powder with the zinc oxide powder in a proper ratio in the present invention, the fillers can be most appropriately dispersed into an organopolysiloxane to enable the resulting grease to acquire a moderate consistency and avoid deterioration in the dispensation suitability. As a result, the present thermal conductive grease can have thermal conductivity on a very high level, namely $6.0 \times 10^{-3}$ cal/cm·sec·° C. or above.

It is desirable that the thickener used in the present invention be constituted of an aluminum nitride powder and a zinc oxide powder and the proportion of the zinc oxide powder to the total powders be from 5 to 50 weight % When the zinc oxide powder is mixed in a proportion lower than 5 weight %, it cannot fill up sufficiently the gaps among hard aluminum nitride particles to fail in not only efficiently improving the thermal conductivity but also imparting satisfactory dispensation suitability to a thermally conductive material intended for grease.

When the zinc oxide powder is mixed in a proportion higher than 50 weight %, on the other hand, it becomes difficult to produce an improvement in thermal conductivity, because the thermal conductivity of zinc oxide powder ($6.0 \times 10^{-2}$ cal/cm·sec·° C. in theory) is almost one order in magnitude lower than that of aluminum nitride powder ($7.7 \times 10^{-1}$ cal/cm·sec·° C.).

(C) Hydroxyl Group-containina Organopolysiloxane:

The component (C) of the present composition is an organopolysiloxane represented by compositional formula, $R^7_b(OH)_c SiO_{(4-b-c)/2}$, which has at least one per molecule of hydroxyl group attached directly to a silicon atom. In the formula, $R^7$ groups are the same or different groups selected from monovalent organic groups, and b and c satisfy the following relation; $1.8 \leq b+c \leq 2.3$ and $0.0001 \leq c/(b+c) \leq 0.1$.

Specifically, the monovalent organic groups from which $R^7$ groups can be selected include 1–30C monovalent unsubstituted or substituted hydrocarbon groups, such as alkyl groups (e.g., methyl, ethyl, propyl, butyl, pentyl, hexyl, octyl, decyl, dodecyl, tetradecyl, hexadecyl, octadecyl, etc.), cycloalkyl groups (e.g., cyclohexyl), alkenyl groups (e.g., vinyl, allyl, etc.), aryl groups (e.g., phenyl, naphthyl, tolyl, etc.) and groups formed by substituting part or all of the hydrogen atoms attached to carbon atoms in the above-recited groups with halogen atom(s), cyano group(s), hydroxyl group(s) or so on (e.g., chloromethyl, 3,3,3-trifluoropropyl, cyanopropyl, phenol, hindered phenol, etc.); amino group-containing organic groups; polyether group-containing organic groups; and epoxy group-containing organic groups. Of these groups, a methyl group, a phenyl group and 6–14C alkyl groups are particularly favorable for the present invention.

The hydroxyl group-containing organopolysiloxanes as mentioned above may have any of linear, branched and cyclic structures, and further two or more of those organopoly-siloxanes different in structure can be used as a mixture. However, it is desirable for the present hydroxyl group-containing organopolysiloxanes to have a linear structure or a structure akin thereto, so that the desirable range of (b+c) is from 1.9 to 2.2, although (b+c) is defined above as the number ranging from 1.8 to 2.3.

Further, from the viewpoint of preventing the oil separation, c/(b+c) is desirably from 0.0002 to 0.08 although it is defined above as the number ranging from 0.0001 to 0.1.

When c/(b+c) is less than 0.0001, the resulting organopolysiloxnes cannot have sufficient effect on the inhibition of oil bleeding; while it is more than 0.1, the resulting composition is too soft to be used as grease and suffers aggravation of oil bleeding.

More specifically, the hydroxyl group-containing organopolysiloxanes as mentioned above are represented by the following formula (III):

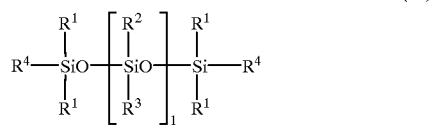

(III)

wherein $R^1$ is a group selected from 1–30C unsubstituted or substituted monovalent hydrocarbon groups, such as alkyl groups (e.g., methyl, ethyl, propyl, butyl, amyl, octyl, etc.), alkenyl groups (e.g., vinyl, allyl, etc.), aryl groups (e.g., phenyl, tolyl, etc.) and groups formed by substituting part or all of the hydrogen atoms attached to carbon atoms in the above-recited groups with halogen atom(s), cyano group(s), hydroxyl group(s) or so on (e.g., chloromethyl, 3,3,3-trifluoropropyl, cyanopropyl, phenol, hindered phenol, etc.); $R^2$ and $R^3$ are hydrogen atoms, hydroxyl groups, or the same or different monovalent organic groups selected from the same monovalent organic groups as represented by $R^1$, amino group-containing organic groups, polyether group-containing organic groups or epoxy group-containing organic groups; $R^4$ is a hydrogen atom, a hydroxyl group or a group selected from the same monovalent hydrocarbon groups as represented by $R^1$ or the same monovalent organic groups as represented by $R^2$ and $R^3$; and l is a positive number to enable the resulting polysiloxane to have a viscosity of from 50 to 500,000 cs at 25° C.

With respect to the groups represented by $R^2$ and $R^3$, alkyl groups, such as methyl and ethyl groups, aryl groups, such as phenyl and tolyl groups, and groups formed by substituting part or all of the hydrogen atoms attached to carbon atoms of those groups with hydroxyl group(s) are suitable from the viewpoints of ease in synthesis and thermal resistance and electric insulation of the oil obtained. In particular, a methyl group, a phenyl group and 6–14C alkyl groups are preferred over the others.

For $R^2$ to $R^4$ in the organopolysiloxane used as Component C of the present composition, it is essential that at least one of them be a hydroxyl group.

From the viewpoint of grease characteristics, it is desirable for those hydroxyl group-containing organopolysiloxanes to have their viscosity at 25° C. in the range of 50 to 500,000 cs, preferably 50 to 300,000. When the viscosity is lower than 50 cs, the grease obtained is inferior in oil separation inhibiting effect; while, when it is higher than 500,000 cs, the grease obtained is too viscous and considerably inferior in dispensation suitability.

Examples of an organopolysiloxane as described above include organopolysiloxanes which are blocked with diorganomonohydrosilyl groups at their individual molecular chain ends, as represented by the following formula (IV):

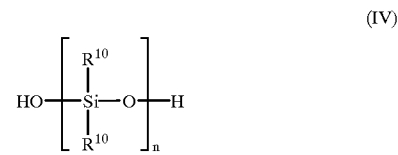

(IV)

wherein $R^{10}$ groups, which may be the same or different, each represent a group selected from 1–18C unsubstituted and substituted monovalent hydrocarbon groups, and n is from 10 to 10,000.

Examples of a group as $R^{10}$ in the above formula (IV) representing an organopolysiloxane having hydroxyl groups at the both molecular ends which is used as Component (C) of the present composition include alkyl groups, such as methyl, ethyl, propyl, hexyl, octyl, decyl, dodecyl, tetradecyl, hexadecyl and octadecyl groups; cycloalkyl groups, such as cyclopentyl and cyclohexyl groups; alkenyl groups, such as vinyl and allyl groups; aryl groups, such as phenyl and tolyl groups; aralkyl groups, such as 2-phenylethyl and 2-methyl-2-phenylethyl groups; and halogenated hydrocarbon groups, such as 3,3,3-trifluoropropyl, 2-(perfluorobutyl)ethyl, 2-(perfluorooctyl)ethyl and p-chlorophenyl groups. Of these groups, methyl, phenyl and 6–14C alkyl groups are preferred over the others.

Additionally, when n is less than 10 in an organopolysiloxane represented by formula (IV), the organopolysiloxane is liable to cause a contact point disturbance because it becomes volatile; while, when n is greater than 10,000, the organopolysiloxane becomes viscous to make it difficult to be dispersed homogeneously upon mixing with the other components, Accordingly, it is desirable that n be from 10 to 10,000, particularly from 100 to 1,000.

The present Component (C) has an inhibitory effect upon oil bleeding. When it is used in a proportion lower than 0.01 weight %, however, the effect cannot be fully achieved. When it is used in a proportion of higher than 10 weight %, on the other hand, the resulting composition is too hard to be used as grease and lacking in dispensation suitability. Accordingly, the Component (c) is required to be used in a proportion of from 0.01 to 10 weight %. In particular, it is desirable for Component (C) to have its proportion in the range of 0.1 to 1 weight %.

(D) Alkoxysilane:

The alkoxysilanes usable as Component (D) are represented by formula $R^8{}_d Si(OR^9)_{(4-d)}$. $R^8$ groups in the formula may be the same or different, and each $R^8$ group represents a 6–20C unsubstituted or substituted monovalent hydrocarbon group: with examples including alkyl groups, such as hexyl, octyl, decyl, dodecyl, tetradecyl, hexadecyl and octadecyl groups; aryl groups, such as phenyl and tolyl groups; aralkyl groups, such as 2-phenylethyl and 2-methyl-2-phenylethyl groups; and halogenated hydrocarbon groups formed by substituting halogen atom(s) for part or all of the hydrogen atoms bonded to carbon atoms in the above-recited groups, such as 2-(perfluoro-butyl)ethyl, 2-(perfluorooctyl)ethyl and p-chlorophenyl groups. Of these groups, 6–14C alkyl groups are preferred over the others.

$R^9$ groups in the above formula may be the same or different, and each $R^9$ group represents a 1–6C alkyl group. Examples of an alkoxy group as $OR^9$ include a methoxy group, an ethoxy group, a propoxy group and a butoxy group. In particular, a methoxy or ethoxy group is preferred as $OR^9$.

d in the above formula is 1, 2 or 3, and the case of d=1 is particularly desirable for the alkoxysilane used as Component (D).

Typical examples of an alkoxysilane as Component (D) are illustrated below, but these examples should not be construed as limiting on the scope of the present invention anyway.

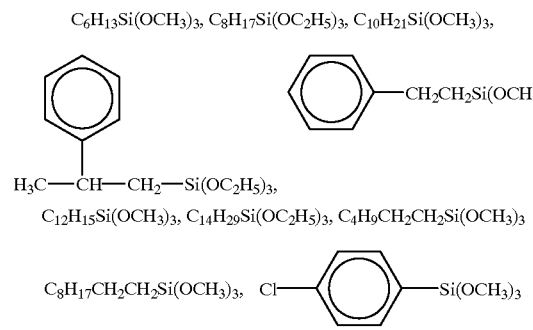

In preparing a thermal conductive silicone composition according to the present invention, the Components (A) to (D) as mentioned above are mixed with a mixing machine, e.g., TRIMIX, TWINMIX or PLANETARY MIXER (which are the trade names of mixers made by INOUE MFG., INC.), ULTRA MIXER (which is the trade name of a mixer made by MIZUHO INDUSTRIAL Co., LTD.) or HIVIS-DISPERMIX (which is the trade name of a mixer made by TOKUSHU KIKA KOGYO CO., LTD.). The mixing may be carried out under heating, if desired. In order to render the thus prepared mixture homogeneous, it is desirable that the mixture be subjected to a kneading operation. Examples of a kneader usable for this operation include a three-rod roll kneader, a colloid mill and a sand grinder. Of these kneaders, a three-rod roll kneader is used to advantage.

The present thermal conductive compositions can inhibit the bleeding of their respective base oils; as a result, when applied between a heat releasing substrate and a cooling plate, they can exhibit their thermal conductive properties steadily over a long period of time to sharply enhance the reliability of appliances. Further, various troubles, such as the staining the surroundings by oil, the insufficient passage of electric current through the electric contact point and the rotation failure of micrometers, can be avoided by the use of the present thermal conductive compositions. Therefore, the present thermal conductive compositions are most suitably used as thermal conductive grease for transistors, IC, diodes, thermistors and like elements incorporated in various kinds of industrial apparatuses as well as home electric appliances and audio instruments.

The present invention will now be illustrated in greater detail by reference to the following examples. However, the invention should not be construed as being limited to these examples.

Additionally, the bleeding control test relating to the present invention is made in the following manner.

Bleeding Control Test:

A ground glass plate, the area of which is the square of 10 cm, is placed horizontally and thereon a 0.25 g portion of each silicone composition is spread in a circle of 1 cm in diameter (as shown in FIG. 1). After the composition is allowed to stand for one day, 7 days and one month respectively at room temperature, the width of a translucent belt, which is formed so as to surround the circle of the composition if the oil bleeds out of the silicone composition to render the ground glass translucent, is measured in mm unit.

Further, the thermal conductivity of each silicone composition is measured at 25° C. with QUICK THERMAL CONDUCTIVITY METER QTM-500 (commercial name, made by KYOTO ELECTRONICS MFG. CO., LTD.). The viscosity values shown in Examples are those measured at 25° C., and the consistency values set forth in Tables are those measured using the testing method defined in JIS K-2220 or ASTM D-217.

EXAMPLES 1–8 AND COMPARATIVE EXAMPLES 1–3

Silicone compositions according to the present invention (Examples 1–8) and compositions for comparison (Comparative Examples 1–3) were each prepared by weighing Components (A) to (D) in their respective amounts as set forth in Table 1 or Table 2, mixing them for 20 minutes at room temperature by means of a planetary mixer having a volume of 5 liter, and further subjecting the resulting mixture to a kneading operation using a three-rod roll kneader three times.

Additionally, the compounds used as Component (A), A-1 to A-4, the compounds used as Component (C), C-1 and C-2, are those having the following structural formulae respectively. The compound B-1 used as Component (B) is an aluminum nitride powder having a hexagonal crystal structure, a spherical particle shape and an average particle size of 0.5 to 5 μm, the compound B-2 used as Component (B) is a zinc oxide powder having an average particle size of 0.2 to 5 μm, and the compound B-3 used as Component (B) is an alumina powder having an apparent average particle size of 30 to 50 μm. The compound D-1 used as Component (D) is an alkoxysilane of formula $C_{10}H_{21}Si(OCH_3)_3$, and the compound D-2 used as Component (D) is an alkoxysilane of formula $C_6H_{13}Si(OCH_3)_3$.

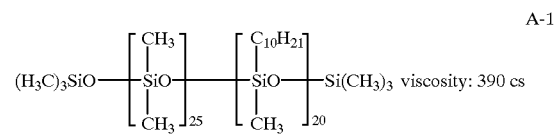

-continued

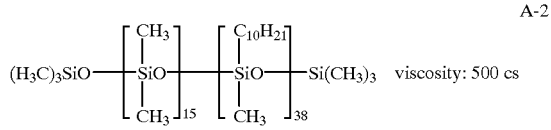

A-2

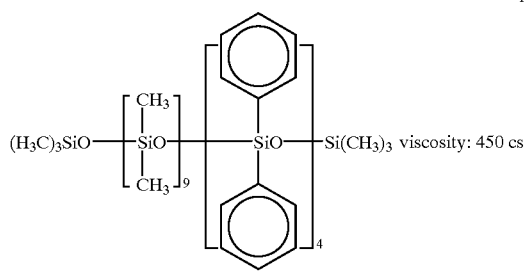

A-3

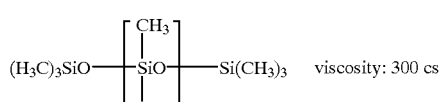

A-4

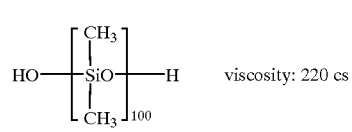

C-1

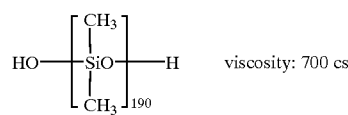

C-2

TABLE 1

| Compound used | Example | | | | | | | |
|---|---|---|---|---|---|---|---|---|
| | 1 | 2 | 3 | 4 | 5 | 6 | 7 | 8 |
| Amount mixed (g) | | | | | | | | |
| Component (A) | | | | | | | | |
| A-1 | 150 | 0 | 150 | 150 | 0 | 0 | 0 | 0 |
| A-2 | 0 | 150 | 0 | 0 | 0 | 0 | 0 | 0 |
| A-3 | 0 | 0 | 0 | 0 | 250 | 0 | 250 | 0 |
| A-4 | 0 | 0 | 0 | 0 | 0 | 250 | 0 | 250 |
| Component (B) | | | | | | | | |
| B-1 | 600 | 550 | 650 | 700 | 0 | 0 | 0 | 0 |
| B-2 | 200 | 250 | 150 | 100 | 0 | 0 | 0 | 0 |
| B-3 | 0 | 0 | 0 | 0 | 700 | 700 | 700 | 700 |
| Component (C) | | | | | | | | |
| C-1 | 10 | 10 | 0 | 10 | 5 | 5 | 0 | 5 |
| C-2 | 0 | 0 | 10 | 0 | 0 | 0 | 5 | 0 |
| Component (D) | | | | | | | | |
| D-1 | 40 | 40 | 40 | 0 | 45 | 45 | 45 | 0 |
| D-2 | 0 | 0 | 0 | 40 | 0 | 0 | 0 | 45 |
| Consistency | 290 | 267 | 280 | 240 | 315 | 305 | 330 | 295 |
| Oil bleeding (mm) | | | | | | | | |
| after 1-day lapse | 0 | 0 | 0 | 0 | 1 | 2 | 2 | 1 |
| after 7-day lapse | 1 | 1 | 2 | 2 | 2 | 2 | 2 | 2 |
| after 1-month lapse | 2 | 2 | 2 | 2 | 3 | 3 | 3 | 4 |
| Thermal conductivity (cal/cm · sec · °C.) × 10⁻³ | 6.7 | 6.9 | 6.7 | 6.5 | 3.1 | 2.9 | 3.1 | 3.1 |

TABLE 2

| Compound used | Comparative Example | | |
|---|---|---|---|
| | 1 | 2 | 3 |
| Amount mixed (g) | | | |
| Component (A) | | | |
| A-1 | 150 | 150 | 150 |
| A-2 | 0 | 0 | 0 |
| A-3 | 0 | 0 | 0 |
| A-4 | 0 | 0 | 0 |
| Component (B) | | | |
| B-1 | 600 | 600 | 600 |
| B-2 | 200 | 200 | 200 |
| B-3 | 0 | 0 | 0 |
| Component (C) | | | |
| C-1 | 10 | 0 | 0 |
| C-2 | 0 | 0.08 | 0 |
| Component (D) | | | |
| D-1 | 0.08 | 0 | 0 |
| D-2 | 0 | 40 | 0 |
| Consistency | solidified | 321 | 290 |
| Oil bleeding (mm) | | | |
| after 1-day lapse | — | 3 | 4 |
| after 7-day lapse | — | 10 | 12 |
| after 1-month lapse | — | 15 | 20 |
| Thermal conductivity (cal/cm · sec · °C.) × 10⁻³ | — | 6.5 | 6.7 |

As can be seen from the data shown in Tables 1 and 2, the thermally conductive silicone compositions prepared in Examples 1–8 had a very low degree of oil bleeding even after one-month lapse, compared with the comparative compositions, as well as thermal conductivity and consistency suitable for heat-reducing grease. The results obtained also indicate that a marked improvement in oil bleeding is produced by adding Components (C) and (D) in proper amounts.

The entire disclosure of all applications, patents and publications, cited above and below, and of corresponding Japanese application No. 225715/'97, filed Aug. 6, 1997, is hereby incorporated by reference.

What is claimed is:

1. A thermally conductive silicone composition comprising (A) 5 to 30 weight % of a liquid silicone, (B) 50 to 94.98 weight % of at least one thickener selected from the group consisting of a zinc oxide powder, an aluminum powder, an aluminum nitride powder, a boron nitride powder and a silicon carbide powder, (C) 0.01 to 10 weight % of an organopolysiloxane having at least one per molecule of hydroxyl group attached directly to a silicon atom, and (D) 0.01 to 10 weight % of an alkoxysilane.

2. A thermally conductive silicone composition according to claim 1, wherein the liquid silicone as Component (A) is an organopolysiloxane represented by compositional formula $R_aSiO_{(4-a)/2}$ wherein R groups may be the same or different, each R being a group selected from monovalent organic groups, excepting a hydroxyl group, and a is a number of 1.8–2.3.

3. A thermally conductive silicone composition according to claim 1, wherein the liquid silicone as Component (A) has a viscosity of from 50 to 500,000 cs at 25° C.

4. A thermally conductive silicone composition according to claim 1, wherein the thickener as Component (B) is at least one thermally conductive filler selected from the group consisting of a zinc oxide powder having an average particle size in the range of 0.2 to 5 μm, an aluminum nitride powder having an average particle size in the range of 0.5 to 5 μm, an alumina powder having an apparent average particle size in the range of 40 to 80 μm, a boron nitride powder having an average particle size in the range of 1 to 10 μm and a silicon carbide powder having an average particle size of 0.4 to 10 μm.

5. A thermally conductive silicone composition according to claim 1, wherein the thickener as Component (B) is a mixture of an aluminum nitride powder with a zinc oxide powder and the ratio of the zinc oxide powder to the total thickener is from 0.05 to 0.5 by weight.

6. A thermally conductive silicone composition according to claim 1, wherein the organopolysiloxane as Component (C) is an organopolysiloxane having at least one per molecule of hydroxyl group attached directly to a silicon atom which is represented by compositional formula $R^7_b(OH)_cSiO_{(4-b-c)/2}$ wherein $R^7$ groups are the same or different groups selected from monovalent organic groups and b and c satisfy the following relation; $1.8 \leq b+c \leq 2.3$ and $0.0001 \leq c/(b+c) \leq 0.1$.

7. A thermally conductive silicone composition according to claim 6, wherein b+c is from 1.9 to 2.1 and c/(b+c) is from 0.0002 to 0.08.

8. A thermally conductive silicone composition according to claim 6, wherein the organopolysiloxane as Component (C) is an organopolysiloxane represented by the following formula;

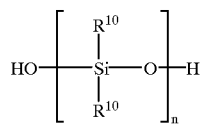

wherein $R^{10}$ groups are the same or different, each being a group selected from 1–18C unsubstituted and substituted monovalent hydrocarbon groups, and n is from 10 to 10,000.

9. A thermally conductive silicone composition according to claim 1, wherein the alkoxysilane as Component (D) is an alkoxysilane represented by formula $R^8_dSi(OR^9)_{(4-d)}$ wherein $R^8$ groups are the same or different, each being a 6–20C unsubstituted or substituted monovalent hydrocarbon group, $R^9$ groups are, the same or different, each being a 1–6C alkyl group, and d is 1, 2 or 3.

10. A thermally conductive silicone composition according to claim 9, wherein $R^8$ is a 6–14C alkyl group, each $R^9$ group is a methyl group or an ethyl group and d is 1.

11. A thermally conductive silicone composition according to claim 2, wherein each of the R groups is a methyl group, a phenyl group or an alkyl group having 6 to 14 carbon atoms.

12. A thermally conductive silicone composition according to claim 2, wherein the organopolysiloxane is an organopolysiloxane of structural formula:

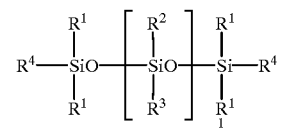

wherein each of $R^1$ groups is a monovalent hydrocarbon group selected from alkyl groups, cycloalkyl groups, alkenyl groups, aryl groups or groups formed by substituting a halogen atom, cyano group or hydroxyl group for at least one of the hydrogen atoms attached to carbon atoms in the above-recited groups; $R^2$ and $R^3$ groups are the same or different, and each of them is the same monovalent hydrocarbon group as $R^1$ represents, an amino group-containing organic group, a polyether group-containing organic group or an epoxy group-containing organic group; $R^4$ is a hydrogen atom, the same monovalent hydrocarbon group as $R^1$ represents or the same monovalent organic group as $R^2$ or $R^3$ represents; and l is a positive number to ensure the viscosity of from 50 to 500,000 cs at 25° C. in the organopolysiloxane.

13. A thermally conductive silicone composition according to claim 2, wherein the organopolysiloxane is an organopolysiloxane of structural formula:

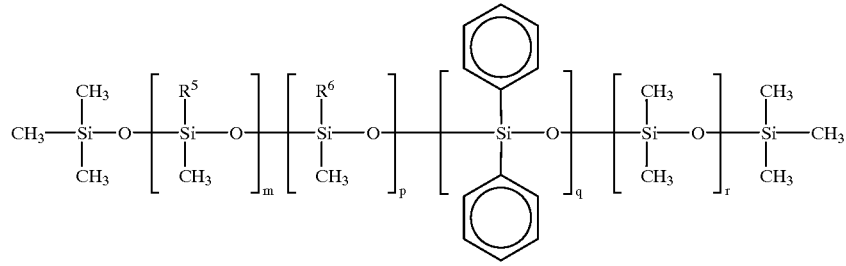

wherein $R^5$ is $-C_4H_9$, $-C_6H_{13}$, $-C_8H_{17}$, $-C_{10}H_{21}$, $-C_{12}H_{25}$, $-C_{15}H_{31}$ or $-C_{18}H_{37}$; $R^6$ is a 2-phenylethyl group or a 2-phenylpropyl group; and m, p, q and r are each a number satisfying the following equations: $0 \leq m \leq 1,000$, $0 \leq p \leq 1,000$, $0 \leq q \leq 1,000$, $0 \leq r \leq 2,000$ and $5 \leq m+p+q+r \leq 2,000$.

14. The silicone composition according to claim 12, wherein said aryl group is phenyl, naphthyl or tolyl.

15. The silicone composition according to claim 2, wherein a is a number of 1.9–2.1.

16. The silicone composition according to claim 3, wherein component (A) has a viscosity of from 50 to 300,000 cs at 25°C.

17. The silicone composition according to claim 3, wherein component (A) has a viscosity of from 100 to 100,000 cs at 25°C.

18. The silicone composition according to claim 12, wherein $R^2$ and $R^3$ are each a methyl group, a phenyl group, or an alkyl group having 6 to 14 carbon atoms.

19. The silicone composition according to claim 6, wherein the $R^7$ groups are selected from a methyl group, a phenyl group, or an alkyl group having 6 to 14 carbon atoms.

20. The silicone composition according to claim 9, wherein each $R^8$ group is an alkyl group having 6 to 14 carbon atoms; each $OR^9$ group is methoxy or ethoxy; and d is 1.

* * * * *